UNITED STATES PATENT OFFICE.

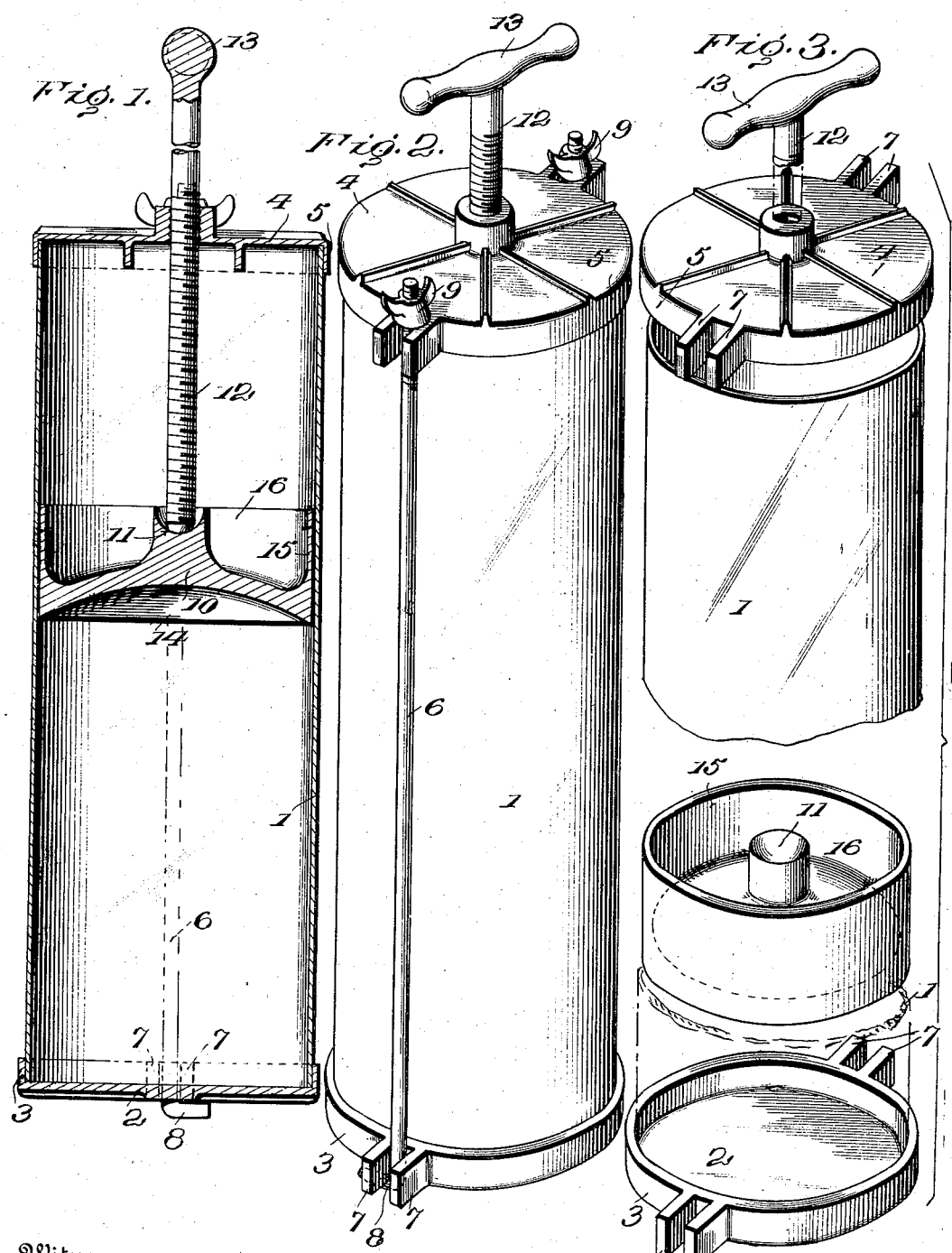

MARK E. HILL, OF WASHINGTON, DISTRICT OF COLUMBIA, ASSIGNOR OF ONE-FOURTH TO LE BLOND BURDETT, OF WASHINGTON, DISTRICT OF COLUMBIA.

MEAT-BOILER.

1,027,251.          Specification of Letters Patent.          Patented May 21, 1912.

Application filed December 1, 1910. Serial No. 595,112.

*To all whom it may concern:*

Be it known that I, MARK E. HILL, of Washington, in the District of Columbia, have invented certain new and useful Improvements in Meat-Boilers, of which the following is a specification.

My invention relates to meat boilers in which meats of various kinds as beef, boned ham, etc., are cooked and compacted.

The salient characteristics of my meat boiler are its simplicity, the readiness with which it may be subjected to sanitary cleansing and its efficient adaptability to the requirements in individual cases.

To secure ease of sanitary cleansing I employ as the meat holding receptacle an open-ended tube of any desired cross-section separable from all other parts of my boiler. In connection with the tube I employ, in the illustrated embodiment of my invention, a closure which preferably comprises also a base, a cross-head normally in fixed relation to the closure, a follower fitting within the tube and constituting another closure therefor and means for operating the follower.

By far the most efficient operating means are manual, since both too little and too much pressure are undesirable and since the pressure can be exactly suited to the individual case only by such means. The screw is simple and effective, its action being gradual and sufficiently powerful, and I prefer its use.

The features of construction, the method of operation and the manifold advantages of my meat boiler will more fully appear hereinafter.

My invention therefore consists in the meat boiler, the preferred embodiment of which is described in the specification, and illustrated in the drawings, and which is more particularly pointed out in the appended claims.

Referring to the drawings:—Figure 1 is a vertical section. Fig. 2 is a perspective view, and Fig. 3 is a perspective view, parts of the tube being broken away to show the construction of the follower and closure.

My apparatus is designed to secure the necessary compactness in the cooked product and to enable any shrinkage during cooking to be exactly taken up as well as to fill out any cavities left by taking out the bones from the meat, particularly in the case of boned hams. In order to secure simplicity and the ready sanitary cleansing of the apparatus, I employ very few parts and make these separable. The meat holding receptacle takes the form of an open-ended tube 1 of desired cross-section which may be entirely separated from all the other parts of the apparatus. For this tube I provide a closure 2 which preferably constitutes also a base on which the boiler may stand upright. This closure is illustrated as a cover for the end of the tube and as having a flange 3 surrounding the tube. At the other end of the tube is located the cross head 4 which is illustrated as a plate constituting a cover for the end of the tube and having a flange 5 surrounding it. This is desirable in order that heat may be retained when the boiler is in use, but is not the necessary form of the cross head. Clamping rods 6 co-acting with lugs 7 correspondingly located on the closure 2 and on the cross head 4 serve to lock these parts removably together and to the tube. Obviously the clamping means may be varied. As shown, the rods have L shaped ends 8 at one end and are screw threaded at the other, being provided with wing nuts 9. Fitting and sliding within the tube is the follower 10 having the central bearing 11 for the screw 12 which works through the cross head which is correspondingly screw threaded and which is provided with the handle 13 by which the screw is turned manually to advance the follower. The face of the follower may be of the shape desired. Where the boiler is used for hams, I prefer to make it slightly concave as at 14 on the side in contact with the meat. In order to prevent the follower from becoming skewed and to insure its proper movement the follower is made very thick at the edges so that a large bearing surface against the interior of the tube is provided. I have shown this follower as having a surrounding flange 15 and as being cupped or having a cavity 16, the purpose of which will shortly be mentioned. While the follower fits within the tube, it is not necessary, or indeed in most cases desirable, that the parts should fit so closely as to prevent some of the juices of the meat from being forced past the edge of the follower. It is for the purpose of catching such juices, etc., that the follower is cupped. It is, moreover, noted also that the other closure of the tube need not be absolutely tight and indeed is preferably not absolutely tight but, while fitting the tube, permits any pickle or preservative in the meat to escape. As my boiler is placed in water for the purpose of boiling the meat any pickle which escapes merely passes into the surrounding water. It is most convenient to stand my boilers upright on the bottom of a vessel containing boiling water, the level of which is preferably below the top of the tube. The handles 13 not only enable the screw to be operated but are an easy means of handling and lifting the boiler.

The precise method of using my meat boiler will depend somewhat on the nature of the meat being treated. In general the apparatus is used in the following way. The meat is placed in the tube 1 and by means of the screw and follower compressed as much as possible. The boiler is then placed in water and subjected to a preliminary cooking, after which the follower may be still further screwed down, the heat turned off and the apparatus left to complete the cooking somewhat in the manner of a fireless cooker for the period found to be necessary. This boiler is effective in the case of boned hams and in the case of hams I have found that a half hour's boiling with the heat turned on is usually about right. At this point, it has been my practice to screw down the follower as far as it would go with one hand without clamping the tube against turning. At the end of two hours I have been accustomed to screw down the follower again and then leave the boiler for about three hours more to complete the cooking. It will be apparent that in the case of hams the hock portion, which while palatable is ordinarily in such shape as to be wasted, since it usually forms a mere projection, is forced by the follower into the body of the meat and is therefore saved. The juices of the meat are for the most part retained therein, but such juices, fats, etc., as are forced between the follower and the interior of the tube pass into the cupped side of the follower and are retained therein for subsequent use as desired. The cross head, when made as a cover, aids in retaining heat in the tube and for this reason I prefer to make it in this form.

From the drawings and above description, it will be apparent that all the parts may be separated from each other so that each may be readily cleansed. In the case of the tube particularly, it will be noted that there is no part permanently attached to it. Rapid and sanitary cleansing is demanded in apparatus of this kind, particularly at the present time.

By specifying in some of the claims means for holding the cross head normally in fixed relation to the closure, I have no intention of implying that said means must be separate or distinct from the tube and may not be a part or configuration thereof, or attached thereto, or separate therefrom.

What I claim as my invention is:

1. A meat cooker comprising in combination, a tube open at both ends, a closure therefor in close contact with one end of the tube to form a tight joint therewith, a cross-head, means for holding said cross-head normally in fixed relation to said closure, a follower between said cross-head and closure fitting the tube and sliding therein, and manually operable means for forcing the follower toward the closure, said parts being separable from said open-ended tube whereby it may be readily subjected to sanitary cleansing.

2. A meat cooker comprising in combination, a tube open at both ends, a closure therefor constituting the bottom of the tube and being in close contact with the lower end thereof to form a tight joint therewith, a cross-head supported from the other end of the tube and normally in fixed relation to the closure, means for removably securing said parts together, a follower between said cross-head and closure fitting the tube and sliding therein, and a screw working through said cross-head against the follower to force the follower toward the closure, said parts being separable from said open-ended tube whereby it may be readily subjected to sanitary cleansing.

3. A meat cooker comprising in combination, a tube open at both ends, a closure for one end of the tube, a cross-head receiving its support from the tube means for holding said cross head normally in fixed relation to the closure, a follower fitting the tube and sliding therein between the cross-head and closure, and means acting against the cross-head and follower but separable from both for forcing the follower toward the closure, said follower being separable from said tube and said cross-head and closure being removable from the respective ends of the tube.

4. A meat cooker comprising in combination, an upright tube open at both ends, a closure therefor constituting a supporting base for the tube and forming with the lower end thereof a tight joint, a cross-head supported by the upper end of the tube, means for removably securing said closure and cross-head to the tube, a follower having a cupped top to catch and hold juices, etc., compressed out of the meat and fitting and sliding in the tube, said parts being separable from each other, and means for forcing said follower toward said closure.

Signed by me at Washington, D. C., this 1st day of December, 1910.

MARK E. HILL.

Witnesses:
 THOMAS E. ROBERTSON,
 BENJ. R. JOHNSON.